US011008064B2

(12) United States Patent
Tajiri et al.

(10) Patent No.: US 11,008,064 B2
(45) Date of Patent: May 18, 2021

(54) INTERNAL COMBUSTION ENGINE

(71) Applicant: HONDA MOTOR CO., LTD., Tokyo (JP)

(72) Inventors: Kazuya Tajiri, Wako (JP); Yuki Takano, Wako (JP); Masaki Cho, Wako (JP); Hiroyuki Natsui, Wako (JP); Tomiyuki Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/645,148

(22) PCT Filed: Jun. 7, 2018

(86) PCT No.: PCT/JP2018/021892
§ 371 (c)(1),
(2) Date: Mar. 6, 2020

(87) PCT Pub. No.: WO2019/049447
PCT Pub. Date: Mar. 14, 2019

(65) Prior Publication Data
US 2020/0398932 A1   Dec. 24, 2020

(30) Foreign Application Priority Data
Sep. 8, 2017   (JP) .............................. JP2017-172634

(51) Int. Cl.
*F02N 11/04*   (2006.01)
*F02F 7/00*    (2006.01)
(Continued)

(52) U.S. Cl.
CPC ................. *B62M 7/02* (2013.01); *F01P 3/20* (2013.01); *F02B 61/02* (2013.01); *F02N 11/04* (2013.01);
(Continued)

(58) Field of Classification Search
CPC ................. F02N 11/04; F02N 11/0859; F02N 2200/021; F02B 75/22; F02F 2007/0075; F02F 7/00; F02F 7/0012
See application file for complete search history.

(56) References Cited

U.S. PATENT DOCUMENTS

2008/0228376 A1*  9/2008  Usukura ................. F02D 37/02
                                                      701/103
2011/0017165 A1*  1/2011  Osawa ................ F02N 11/0859
                                                      123/179.4
(Continued)

FOREIGN PATENT DOCUMENTS

JP   H08-21242 A    1/1996
JP   H11-229891 A   8/1999
(Continued)

*Primary Examiner* — Long T Tran
(74) *Attorney, Agent, or Firm* — Carrier Blackman & Associates, P.C.; Joseph P. Carrier; William D. Blackman

(57) ABSTRACT

An internal combustion engine for being mounted laterally on a saddle-type vehicle includes an AC generator disposed on an end portion of a crankshaft which is supported in a crankcase. An ACG cover covers the AC generator from outside widthwise across the vehicle. The ACG cover includes an electric power transmission line cover bulging portion covering electric power transmission lines extending to the ACG cover and bulging sideways outwardly widthwise across the vehicle. A crank angle sensor is disposed behind the electric power transmission line cover bulging portion in a vehicle front-back direction. The crank angle sensor is thus protected from flying stones, etc. without an increase in the number of parts used and an increase in the weight of the internal combustion engine.

12 Claims, 8 Drawing Sheets

(51) Int. Cl.
    *B62M 7/02*        (2006.01)
    *F01P 3/20*        (2006.01)
    *F02B 61/02*       (2006.01)

(52) U.S. Cl.
    CPC ..... *F01P 2050/16* (2013.01); *F02N 2200/021* (2013.01)

(56) References Cited

U.S. PATENT DOCUMENTS

2016/0102644 A1\*   4/2016   Ouchi ................... H02K 21/22
                                                                290/31
2018/0283317 A1\*  10/2018   Shigematsu .......... F02F 7/0043

FOREIGN PATENT DOCUMENTS

| | | |
|---|---|---|
| JP | 2005-030311 A | 2/2005 |
| JP | 2011-196218 A | 10/2011 |
| JP | 3193850 U | 10/2014 |
| WO | 2016/143813 A1 | 9/2016 |

\* cited by examiner

INTERNAL COMBUSTION ENGINE

TECHNICAL FIELD

The present invention relates to an internal combustion engine for use on vehicles which includes a crank angle sensor for detecting the rotation angle of a crankshaft.

BACKGROUND ART

It has been known in the art to detect the rotation angle of a crankshaft with a crank angle sensor that detects a number of protrusions disposed as detectable members on the outer circumference of a rotor that rotates in unison with the crankshaft (see Patent Document 1).

PRIOR ART DOCUMENT

Patent Document

Patent Document 1: JP 2005-30311 A

Patent Document 1 discloses a structure in which the crank angle sensor is fittingly inserted from the front into a lower block, which corresponds to a crankcase, by which the crankshaft oriented widthwise across the vehicle is rotatably supported.

The crank angle sensor extends through the lower block and is mounted in position by having a distal-end detector disposed in a position facing the outer circumferential surface of the rotor and a proximal-end portion projecting outwardly.

Since the crank angle sensor projects forwardly from the lower block as described above, the front side of the crank angle sensor is covered with a bracket that supports a compressor, protecting the crank angle sensor from flying stones, etc.

SUMMARY OF THE INVENTION

Underlying Problem to be Solved by the Invention

With the structure disclosed in Patent Document 1, as the compressor is disposed in front of the lower block, the bracket that supports the compressor is used as a shield member for protecting the crank angle sensor from flying stones, etc.

In internal combustion engines mounted on saddle-type vehicles, however, there is a limitation on the layout of accessories or the like around the crankcase, making it difficult to use the accessories or the like to protect the crank angle sensor disposed around the crankshaft from flying stones, etc. Therefore, a special new shield member is required, resulting in an increase in the number of parts used.

The present invention has been made in view of the above problems. It is an object of the present invention to provide an internal combustion engine that can protect a crank angle sensor from flying stones, etc. without an increase in the number of parts used and an increase in the weight of the internal combustion engine.

Means to Solve the Problem

To achieve the aforementioned object, there is provided, in accordance with the present invention, an internal combustion engine for being mounted laterally on a saddle-type vehicle with a crankshaft oriented widthwise across the vehicle and rotatably supported by a crankcase, in which an AC generator is disposed on an end portion of the crankshaft which extends through and projects out of the crankcase, an ACG cover covers the AC generator from outside widthwise across the vehicle, electric power transmission lines extend from the AC generator and are covered with an electric power transmission line cover bulging portion bulging sideways outwardly widthwise across the vehicle of the ACG cover, and a crank angle sensor for detecting rotational angles of the crankshaft is disposed behind the electric power transmission line cover bulging portion in a vehicle front-back direction.

With this arrangement, the ACG cover that covers the AC generator sideways widthwise across the vehicle includes the electric power transmission line cover bulging portion that covers the electric power transmission lines extending from the AC generator, and the crank angle sensor for detecting rotational angles of the crankshaft is disposed behind the electric power transmission line cover bulging portion in a vehicle front-back direction. The electric power transmission line cover bulging portion of the existing ACG cover thereby protects the crank angle sensor from flying stones, etc. without an increase in the number of parts used and an increase in the weight of the internal combustion engine.

According to a preferred embodiment of the present invention, the crank angle sensor is a proximity sensor, the crank angle sensor is fittingly inserted in the ACG cover in a posture oriented toward a crankshaft center of the crankshaft, the AC generator includes an outer rotor rotatable in unison with the crankshaft, the outer rotor having an outer circumferential surface having a plurality of detectable protrusions arrayed circumferentially thereon, and the crank angle sensor is mounted on the ACG cover and has a detector facing the outer circumferential surface of the outer rotor.

With this arrangement, the crank angle sensor, which is a proximity sensor, is fittingly inserted in the ACG cover while being oriented toward the crankshaft center of the crankshaft and is mounted on the ACG cover with the detector facing the outer circumferential surface of the outer rotor of the AC generator. Consequently, the crank angle sensor is disposed in a compact layout closely to the electric power transmission line cover bulging portion of the ACG cover rearwardly of the electric power transmission line cover bulging portion.

The crank angle sensor can be installed with ease as it is a proximity sensor and hence a contactless sensor.

According to the preferred embodiment of the present invention, the crank angle sensor is disposed inwardly widthwise across the vehicle of an outermost portion widthwise across the vehicle of the electric power transmission line cover bulging portion.

With this arrangement, as the crank angle sensor is disposed inwardly widthwise across the vehicle of the outermost portion widthwise across the vehicle of the electric power transmission line cover bulging portion of the ACG cover, the front side of the crank angle sensor is covered sufficiently widely with the electric power transmission line cover bulging portion of the ACG cover, and hence the crank angle sensor is reliably protected from flying stones, etc. from the front.

According to the preferred embodiment of the present invention, the crank angle sensor is disposed in a position higher than a crankshaft center of the crankshaft.

With this arrangement, since the crank angle sensor is disposed in a position higher than the crankshaft center of the crankshaft, the ACG cover acts as a shield against flying stones, etc. hurtled upwardly by a front wheel and flying obliquely rearwardly, thereby protecting the crank angle sensor.

According to another preferred embodiment of the present invention, a starter motor is mounted on the crankcase and has a motor output shaft parallel to the crankshaft, and a direction in which the crank angle sensor is fittingly inserted in the ACG cover extends at an acute angle with respect to a straight line interconnecting the crankshaft center of the crankshaft and an output shaft center of the motor output shaft.

With this arrangement, inasmuch as the direction in which the crank angle sensor is fittingly inserted in the ACG cover extends at an acute angle with respect to the straight line interconnecting the crankshaft center of the crankshaft and the output shaft center of the motor output shaft of the starter motor, the crank angle sensor and the starter motor can be disposed closely to each other, making the overall internal combustion engine compact.

According to yet another preferred embodiment of the present invention, a speed reducer gear mechanism for transmitting rotation at a reduced speed is disposed between the motor output shaft and the crankshaft, and the ACG cover integrally includes a cover portion that covers the speed reducer gear mechanism.

With this arrangement, the ACG cover integrally includes the cover portion that covers the speed reducer gear mechanism in a starter system including the starter motor, so that the ACG cover covers, as one component, the AC generator and the speed reducer gear mechanism, resulting in a reduction in the number of parts used.

According to the preferred embodiment of the present invention, at least one cooling water hose of a cooling system of the internal combustion engine is disposed outwardly widthwise across the vehicle of the crank angle sensor.

With this arrangement, at least one cooling water hose of the cooling system of the internal combustion engine is disposed outwardly widthwise across the vehicle of the crank angle sensor. Therefore, the cooling water hose essentially acts as a shield against flying stones, etc. from outside widthwise across the vehicle, thereby protecting the crank angle sensor.

According to the preferred embodiment of the present invention, the cooling water hose overlaps at least a portion of the crank angle sensor, as viewed in side elevation.

With this arrangement, as the cooling water hose overlaps at least a portion of the crank angle sensor, as viewed in side elevation, the cooling water hose acts as a shield against flying stones, etc. coming sideways, thereby essentially reliably protecting the crank angle sensor.

Effects of the Invention

According to the present invention, the ACG cover that covers the AC generator sideways widthwise across the vehicle includes the electric power transmission line cover bulging portion that covers the electric power transmission lines extending from the AC generator, and the crank angle sensor for detecting the rotational angles of the crankshaft is disposed behind the electric power transmission line cover bulging portion in a vehicle front-back direction. The electric power transmission line cover bulging portion of the existing ACG cover thereby protects the crank angle sensor from flying stones, etc. without use of a support member or the like of an accessory and an increase in the number of parts used.

MODE FOR CARRYING OUT THE INVENTION

An embodiment of the present invention will hereinafter be described with reference to the drawings.

Figure 1:
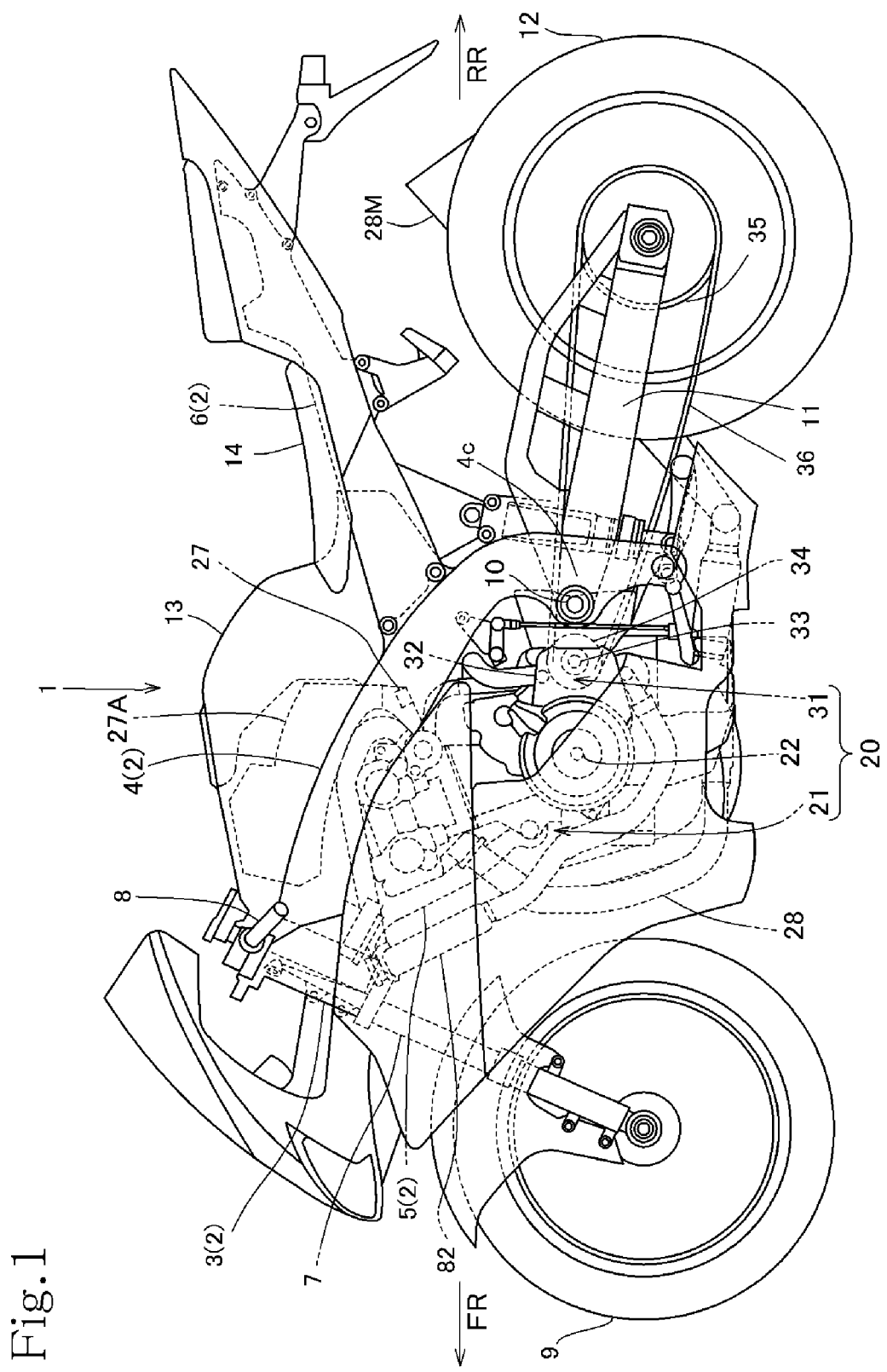
FIG. 1 is an overall side elevational view of a motorcycle that incorporates an internal combustion engine according to an embodiment of the present invention.

FIG. 1 illustrates in side elevation a motorcycle 1 that is a saddle-type vehicle and incorporates an internal combustion engine according to an embodiment of the present invention.

In the description that follows, forward, rearward, leftward, and rightward directions and other similar directional expressions will be referred to in accord with normal standards with respect to the motorcycle 1 that incorporates the internal combustion engine according to the present embodiment and travels straight ahead in a forward direction. In the drawings, FR represents a forward direction, RR a rearward direction, LH a leftward direction, and RH a rightward direction.

As illustrated in FIG. 1, the motorcycle 1, which is illustrated as a saddle-type motorcycle, includes a vehicle body frame 2 having a head pipe 3 from which there extend rearwardly left and right main frames 4 having respective center frame portions 4c bent downwardly. The vehicle body frame 2 includes a down frame 5 extending rearwardly and obliquely downwardly from the head pipe 3, and seat rails 6 extending rearwardly and obliquely upwardly from the front as compared to upper bent portions of the center frame portions 4c of the main frames 4.

A front wheel 9 is rotatably supported on the lower end of a front fork 7 that is steerably supported by the head pipe 3. A steering handle 8 is coupled to the front fork 7.

A rear fork 11 that has a front end pivotally supported on the center frame portions 4c by a pivot shaft 10 extends rearwardly and has a rear end on which a rear wheel 12 is rotatably supported so as to be vertically swingable.

Figure 2:
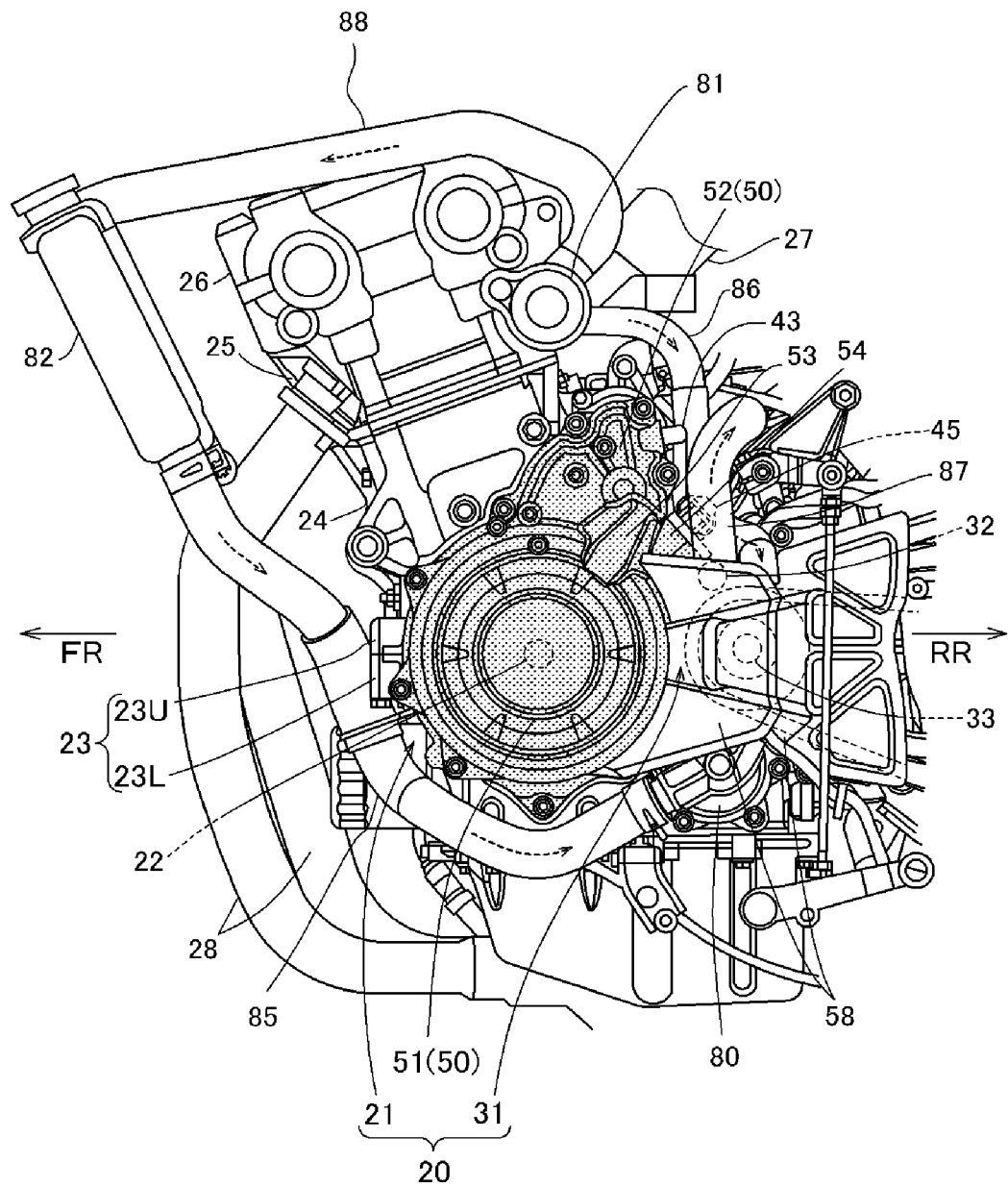
FIG. 2 is a left-hand side elevational view of the internal combustion engine, i.e., power unit, incorporated in the motorcycle.

As illustrated in FIG. 2, a power unit 20 mounted on the vehicle body frame 2 of the motorcycle 1 includes a transmission 31 integrally housed in a rear portion of a crankcase 23 of the internal combustion engine, denoted by 21. The power unit 20 is suspended from the down frame 5 in front of the main frames 4 and also from the main frames 4.

A fuel tank 13 is mounted on the main frames 4 above the power unit 20. A seat 14 is supported on the seat rails 6 behind the fuel tank 13.

The internal combustion engine 21 is a water-cooled 4-cylinder, 4-stroke-cycle internal combustion engine and is mounted on the motorcycle 1 with a crankshaft 22 oriented widthwise across the vehicle, i.e., in leftward and rightward directions.

Referring to FIG. 2, the crankshaft 22 is rotatably supported on the crankcase 23, and a cylinder block 24 and a cylinder head 25 are successively stacked in an upstanding posture on and fastened to the crankcase 23 with a cylinder axis slightly inclined forwardly. The cylinder head 25 is covered with a cylinder head cover 26.

An intake pipe 27 extends upwardly from the cylinder head 25, which is inclined forwardly, of the internal combustion engine 21, and is connected to an air cleaner 27A (see FIG. 1).

Exhaust pipes 28 extending forwardly from the cylinder head 25 are bent downwardly and then extend rearwardly, and are connected to a rear muffler 28M (see FIG. 1).

Figure 4:
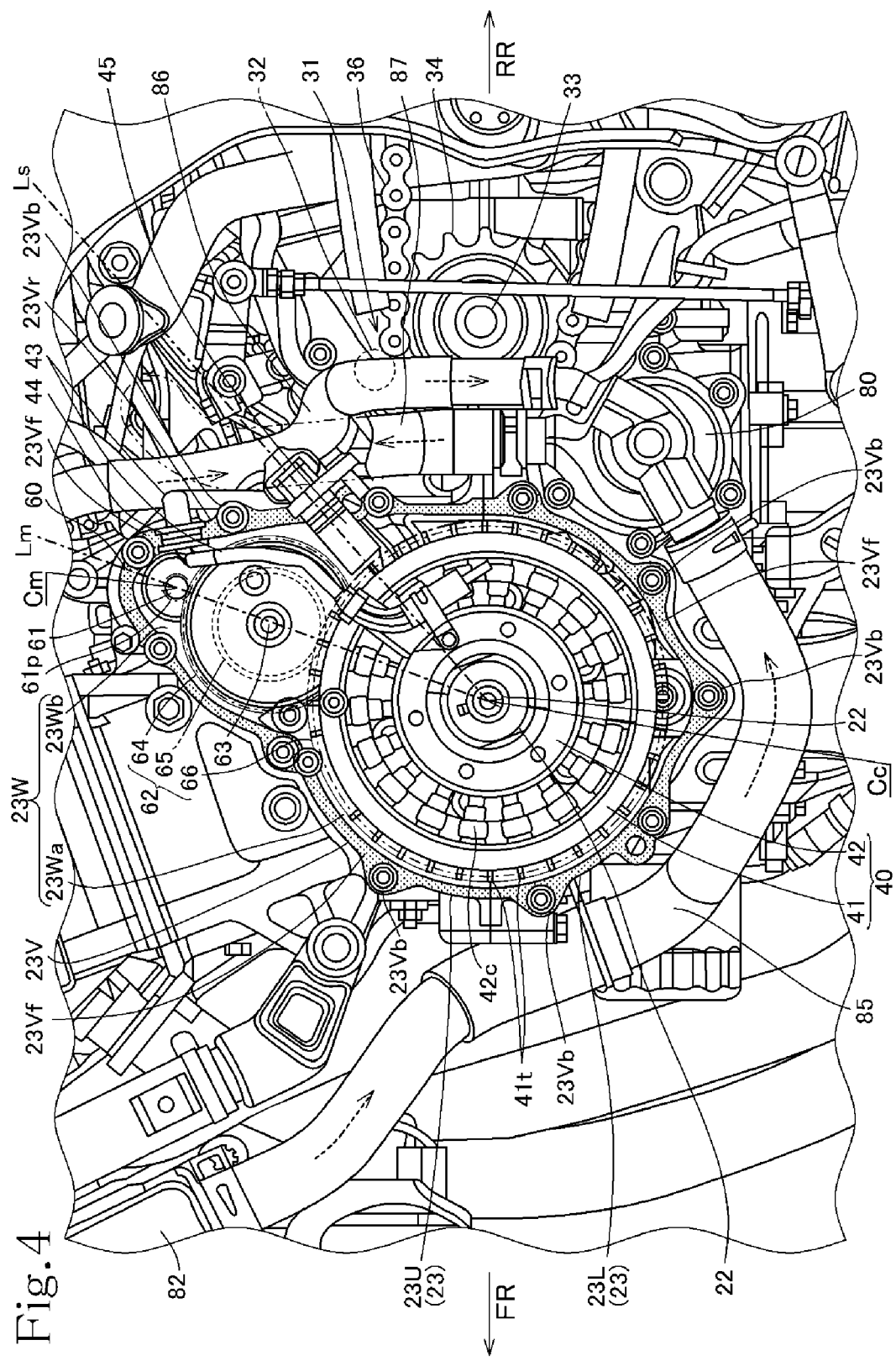
FIG. 4 is a left-hand side elevational view of the internal combustion engine with an ACG cover and the output sprocket cover removed.

As illustrated in FIG. 4, the crankcase 23 of the internal combustion engine 21 includes an upper crankcase 23U and a lower crankcase 23L that are vertically separable from each other. The crankshaft 22 is rotatably supported by mating surfaces of left and right bearing walls of the upper crankcase 23U and the lower crankcase 23L. The transmission 31 includes a main shaft 32 and a countershaft 33 that are oriented in the leftward and rightward directions. The countershaft 33 is also rotatably supported behind the crankshaft 22 by the mating surfaces of the left and right bearing walls of the upper crankcase 23U and the lower crankcase 23L.

The main shaft 32 of the transmission 31 is rotatably supported on the upper crankcase 23U above the countershaft 33 at a position slightly forward thereof.

The transmission 31 includes a transmission drive gear group rotatably supported on the main shaft 32 and a transmission driven gear group rotatably supported on the countershaft 33, the gear groups having gear pairs held in mesh with each other at all times at respective transmission gear ratios.

The countershaft 33 acts as an output shaft of the power unit 20 and projects to the left through the left bearing wall. An output sprocket 34 is fitted over a left end portion of the countershaft 33. The output sprocket 34 is covered with an output sprocket cover 58 (see FIG. 2) attached from the left.

Referring to FIG. 1, the output sprocket 34 is disposed in a position close to the front of the pivot shaft 10 by which the rear fork 11 is supported on the center frame portions 4c. A drive chain 36 is trained around the output sprocket 34 and a driven sprocket 35 fitted over the rear axle of the rear wheel 12. Output power from the power unit 20 is transmitted through the drive chain 36 to the rear wheel 12, propelling the motorcycle 1.

Figure 5:
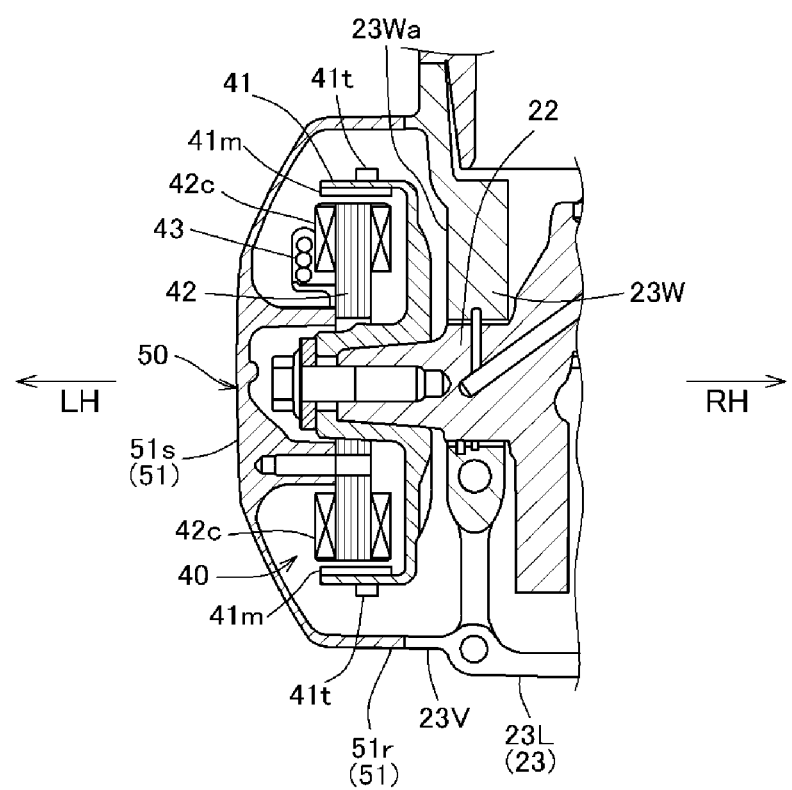
FIG. 5 is a cross-sectional view of an AC generator and peripheral parts of the internal combustion engine.

Referring to FIG. 5, an AC generator 40 is mounted on a left end portion of the crankshaft 22 that extends through a left bearing wall 23W of the left and right bearing walls of the crankcase 23 by which the crankshaft 22 is rotatably supported. The AC generator 40 that projects to the left is covered with an ACG cover 50 attached from the left.

As illustrated in FIG. 5, the ACG generator 40 includes a cup-shaped outer rotor 41 fitted over the left end portion of the crankshaft 22 and an inner stator 42 having electric power generating coils 42c disposed radially inwardly of magnets 41m disposed on an inner circumferential surface of the outer rotor 41. The inner stator 42 is supported on the ACG cover 50 that is placed from the left around the AC generator 40.

Figure 8:
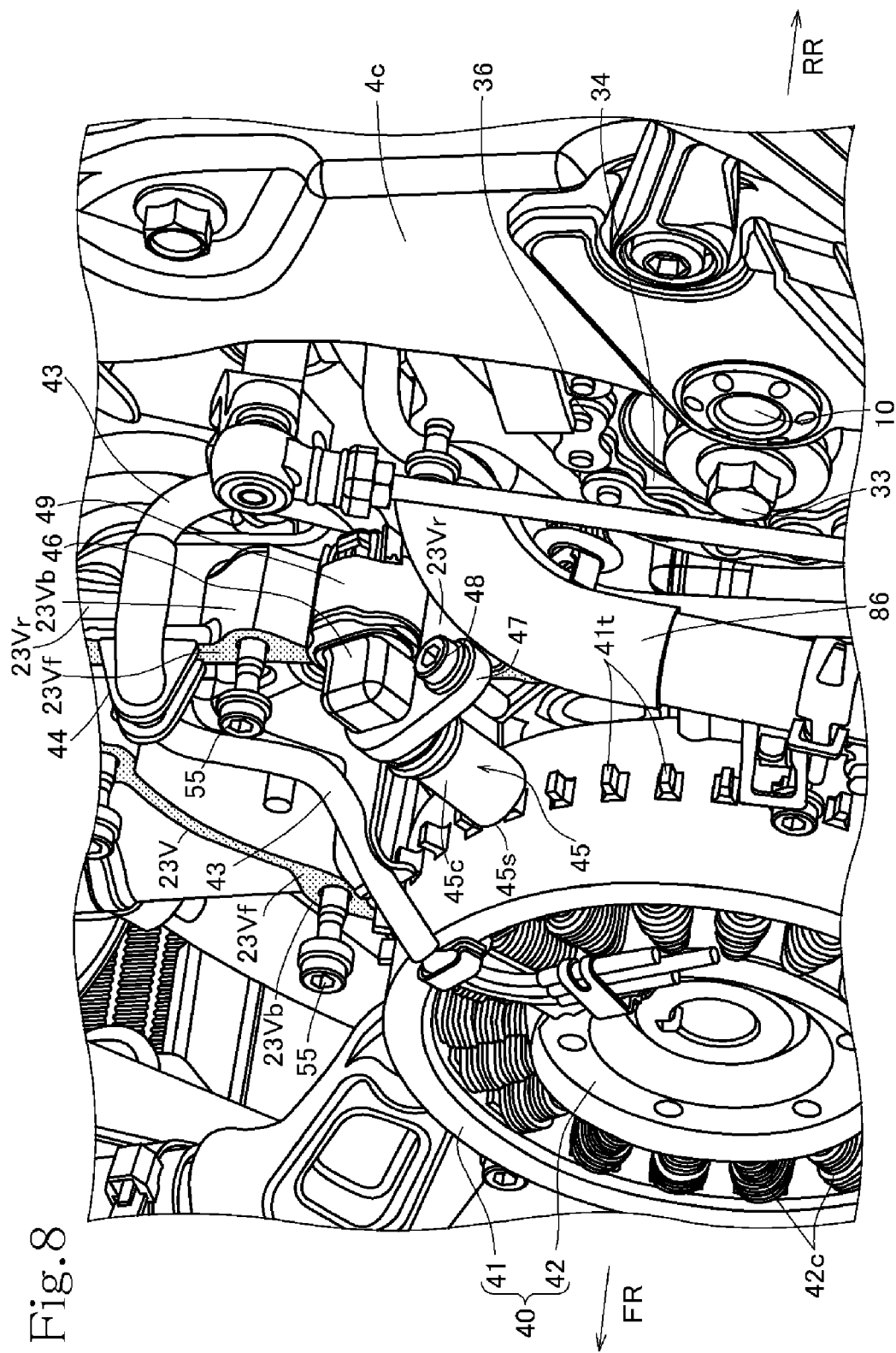
FIG. 8 is a fragmentary perspective view of the internal combustion engine with the ACG cover omitted from illustration.

The outer rotor 41 of the AC generator 40 has a plurality of detectable protrusions 41t projecting from and disposed at circumferentially equally spaced intervals on an outer circumferential surface of the outer rotor 41. The detectable protrusions 41t are also illustrated in FIG. 8.

Referring to FIG. 4, the left bearing wall 23W of the crankcase 23 by which the crankshaft 22 is rotatably supported has a circular wall 23Wa that faces the AC generator 40 and an extension wall 23Wb extending upwardly from the circular wall 23Wa and slightly inclined rearwardly.

The extension wall 23Wb extends in a tapered triangular shape from the circular wall 23Wa. The extension wall 23Wb is inclined rearwardly from the forwardly inclined cylinder block 24 and positioned leftwardly of the cylinder block 24.

A starter motor 60 is held against a right side face of the triangular extension wall 23Wb and disposed on an upper surface of the crankcase 23.

The starter motor 60 has a motor output shaft 61 oriented parallel to the crankshaft 22 widthwise across the vehicle in the leftward and rightward directions. The motor output shaft 61 that projects to the left extends leftwardly through a tapered upper portion of the extension wall 23Wb.

Referring to FIG. 4, the motor output shaft 61 has a pinion gear 61p, and an idle shaft 63 supported rotatably and centrally by the extension wall 23Wb supports a large-diameter gear 64 and a small-diameter gear 65 integrally thereon. The pinion gear 61p of the motor output shaft 61 is held in mesh with the large-diameter gear 64, and the small-diameter gear 65 is held in mesh with a large-diameter driven gear 66 that is mounted on the crankshaft 22 with a one-way clutch interposed therebetween, thereby making up a speed reducer gear mechanism 62 that is disposed along a left side surface of the extension wall 23Wb.

For starting the internal combustion engine 21 to operate, the starter motor 60 is energized to rotate the motor output shaft 61 about its own axis. The rotation of the motor output shaft 61 is transmitted through the speed reducer gear mechanism 62 to the crankshaft 22, which is coercively rotated about its own axis to start the internal combustion engine 21.

As illustrated in FIGS. 4 and 5, the left bearing wall 23W of the crankcase 23 includes a peripheral wall 23V projecting to the left in covering relation to the periphery of the AC generator 40 and the speed reducer gear mechanism 62.

The AC generator 40 projects largely leftwardly from the speed reducer gear mechanism 62, and the peripheral wall 23V projects leftwardly from the speed reducer gear mechanism 62. As illustrated in FIG. 8, however, part of the AC generator 40 is covered with the peripheral wall 23V.

Referring to FIG. 4, the peripheral wall 23V of the crankcase 23 has a left end face as a mating surface 23Vf, illustrated stippled in FIG. 4, for mating with the ACG cover 50. The peripheral wall 23V has a plurality of fastening bosses 23Vb having respective bolt holes defined in the mating surface 23Vf.

The extension wall 23Wb that extends in the tapered triangular shape has two front and rear sides and includes a rear peripheral wall 23Vr on the rear side. The rear peripheral wall 23Vr has an upper portion disposed behind the motor output shaft 61 of the starter motor 60 and having a recess defined in the mating surface 23Vf, with a grommet 44 having one half fitted in the recess.

As illustrated in FIG. 4, three-phase electric power transmission lines 43 extend upwardly from the electric power generating coils 42c of the inner stator 42 of the AC generator 40.

The three-phase electric power transmission lines 43 extend upwardly from an obliquely rearward upper portion of a left side surface of the inner stator 42 of the AC generator 40 along an outer circumferential surface of the outer rotor 41 toward the speed reducer gear mechanism 62 on the right side thereof, then along a left side surface of a rear portion of the speed reducer gear mechanism 62 and upwardly along the rear peripheral wall 23Vr forwardly of the rear peripheral wall 23Vr where the grommet 44 is fitted, and extends through the grommet 44 fitted in the recess in the rear peripheral wall 23Vr to the outside.

Figure 6:
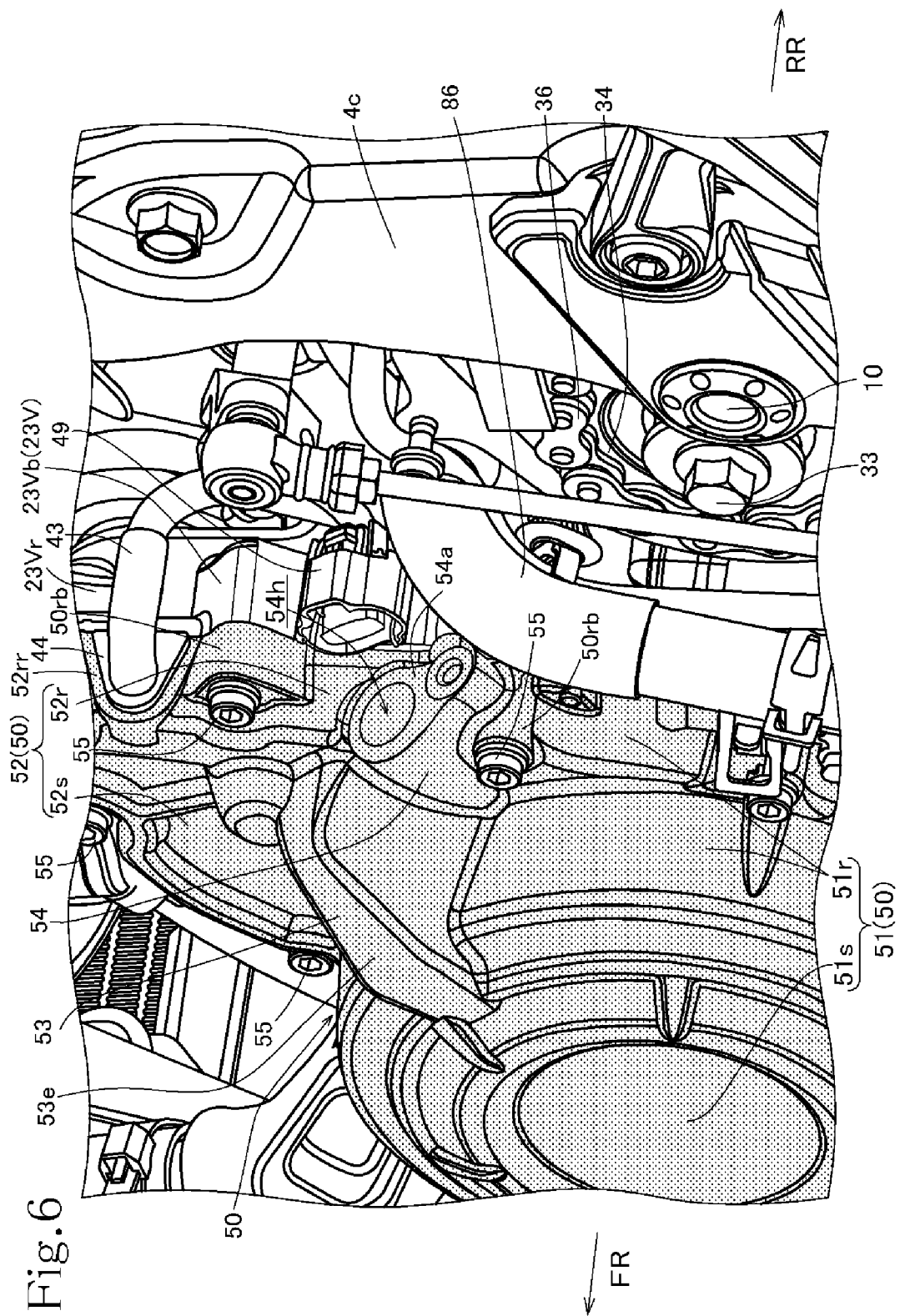
FIG. 6 is a fragmentary perspective view of the internal combustion engine with a crank angle sensor removed.

As illustrated in FIG. 6, the ACG cover 50 covers, from the left, the AC generator 40 and the speed reducer gear mechanism 62 that are disposed within the peripheral wall 23V of the crankcase 23 illustrated in FIG. 8.

The ACG cover 50 includes, as an integral structure, a generator cover portion 51 that covers an outer periphery and a side of the AC generator 40 and a gear cover portion 52 that covers a side of the speed reducer gear mechanism 62.

The generator cover portion 51 includes a peripheral wall portion 51r covering the outer periphery of the AC generator 40 and a circular side wall portion 51s covering a left side of the AC generator 40. The gear cover portion 52 includes a peripheral wall portion 52r covering front and rear portions of the speed reducer gear mechanism 62 and a triangular side wall portion 52s covering a left side of the speed reducer gear mechanism 62.

The peripheral wall portion 51r of the generator cover portion 51 and the peripheral wall portion 52r of the gear cover portion 52 make up a continuous closed annular peripheral wall, which corresponds to the peripheral wall 23V of the crankcase 23, and has a mating surface that mates with the mating surface 23Vf (FIG. 8) of the peripheral wall 23V.

The peripheral wall portions 51r and 52r of the ACG cover 50 have mount bosses 50rb (FIGS. 6 and 7) facing the respective fastening bosses 23Vb of the peripheral wall 23V of the crankcase 23. The fastening bosses 23Vb and the mount bosses 50rb are fastened to each other by fastening bolts 55, mounting the ACG cover 50 on the crankcase 23.

As the AC generator 40 projects leftwardly of the speed reducer gear mechanism 62, the side wall portion 51s of the generator cover portion 51 is displaced leftwardly of the side wall portion 52s of the gear cover portion 52.

The peripheral wall portion 52r of the gear cover portion 52 is of a triangular shape having two front and rear sides including a rear peripheral wall 52rr on the rear side. The rear peripheral wall 52rr has a recess defined therein in facing relation to the recess defined in the rear peripheral wall 23Vr of the crankcase 23 and fitted over the grommet 44 in sandwiching relation thereto (see FIGS. 6 and 7).

The ACG cover 50 includes an electric power transmission line cover bulging portion 53 that bulges in a channel shape sideways outwardly, i.e., to the left, along the peripheral wall portion 51r of the generator cover portion 51, formed rearwardly and downwardly of the side wall 52s, which is of a tapered triangular shape, of the gear cover portion 52.

The electric power transmission line cover bulging portion 53 has an inner space held in fluid communication with an inner space surrounded by the peripheral wall portion 51r of the generator cover portion 51. The electric power transmission line cover bulging portion 53 extends obliquely upwardly from the region where the inner spaces are held in fluid communication with each other, in the direction of the grommet 44 fitted in the recesses in the rear peripheral walls 23Vr and 52rr. The three-phase electric power transmission lines 43 extend through the electric power transmission line cover bulging portion 53 obliquely upwardly in the gear cover portion 52 and through the grommet 44.

Consequently, the three-phase electric power transmission lines 43 are covered with the electric power transmission line cover bulging portion 53 and the gear cover portion 52 all the way from the region where they extend upwardly from the obliquely rearward upper portion of the left side surface of the inner stator 42 of the AC generator 40 to the region where they extend through the grommet 44.

Referring to FIG. 6, a sensor fitting insertion tubular portion 54 where a crank angle sensor 45 (see FIGS. 4 and 8) is fittingly inserted is disposed on a lower portion of the rear peripheral wall 52rr of the gear cover portion 52 of the ACG cover 50.

The sensor fitting insertion tubular portion 54 is disposed on a rear portion of the electric power transmission line cover bulging portion 53 contiguously to the electric power transmission line cover bulging portion 53.

The sensor fitting insertion tubular portion 54 has a fitting insertion hole 54h defined therein that is oriented in an obliquely upward direction perpendicular to the rotational central axis of the crankshaft 22. The fitting insertion hole 54h has an upper end that is open outwardly and a lower end that is open into the ACG cover 50.

The sensor fitting insertion tubular portion 54 has an end face 54a lying around the upper end opening and facing obliquely rearwardly and upwardly.

The crank angle sensor 45 is fittingly inserted in the sensor fitting insertion tubular portion 54.

The crank angle sensor 45 is a proximity sensor. As illustrated in FIG. 8, the crank angle sensor 45 includes a detector 45s on a distal end of a tubular case 45c and an opposite proximal end covered with a connection cap 46. A flange-shaped support bracket 47 is fitted over the tubular case 45c at a position close to the connection cap 46.

The crank angle sensor 45 is fittingly inserted from outside into the fitting insertion hole 54h in the sensor fitting insertion tubular portion 54, and attached to the ACG cover 50 by a bolt 48 that fixes the support bracket 47 held against the end face 54a lying around the upper end opening in the sensor fitting insertion tubular portion 54 and the upper opening end of the sensor fitting insertion tubular portion 54 to each other.

With the crank angle sensor 45 fittingly inserted in the sensor fitting insertion tubular portion 54 of the ACG cover 50 as described above, as illustrated in FIGS. 4 and 8, the detector 45s on the distal end of the crank angle sensor 45 faces the outer circumferential surface, which has the detectable protrusions 41t in large numbers, of the outer rotor 41 of the AC generator 40.

The crank angle sensor 45 detects the rotational angles of the crankshaft 22 by detecting, with the detector 45s, magnetic flux changes caused by the detectable protrusions 41t of the rotating outer rotor 41 as they approach the detector 45s.

The connection cap 46 placed on the proximal end of the crank angle sensor 45 is fitted in a connection connector 49 disposed behind the rear peripheral wall 23Vr of the crankcase 23. A signal line is connected to the connection connector 49 for outputting a detection signal from the crank angle sensor 45.

Figure 7:
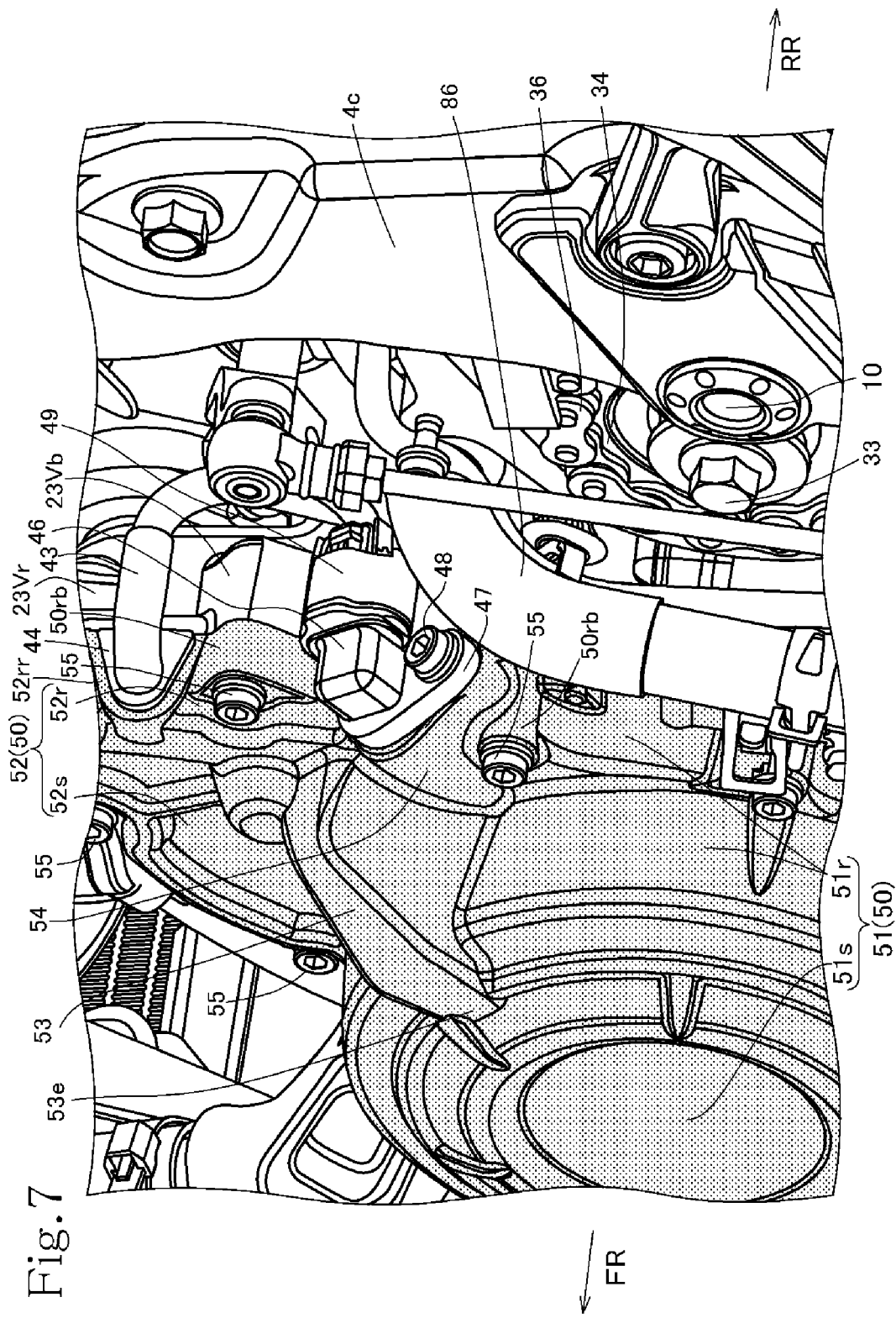
FIG. 7 is a fragmentary perspective view of the internal combustion engine with the crank angle sensor mounted in position.

As described above, the crank angle sensor 45 is fittingly inserted in the sensor fitting insertion tubular portion 54 disposed behind the electric power transmission line cover bulging portion 53, which covers the three-phase electric power transmission lines 43, of the ACG cover 50. As illustrated in FIG. 7, the crank angle sensor 45 is disposed behind the electric power transmission line cover bulging portion 53 and inwardly, i.e., rightwardly, widthwise across the vehicle of an outermost portion 53e, i.e., a left end portion, widthwise across the vehicle of the electric power transmission line cover bulging portion 53.

As illustrated in FIG. 4, the crank angle sensor 45 fittingly inserted in the sensor fitting insertion tubular portion 54 is disposed in a high position above a crankshaft center Cc of the crankshaft 22.

In FIG. 4, which is a side elevational view of the internal combustion engine 21, the crank angle sensor 45 is fittingly inserted in the sensor fitting insertion tubular portion 54 in a direction represented by a straight line Ls that passes through the crankshaft center Cc of the crankshaft 22.

In FIG. 4, the straight line Ls that represents the direction in which the crank angle sensor 45 is fittingly inserted in the sensor fitting insertion tubular portion 54 extends at an acute angle with respect to a straight line Lm interconnecting an output shaft center Cm of the motor output shaft 61 of the starter motor 60 and the crankshaft center Cc of the crankshaft 22.

Referring to FIG. 2, the internal combustion engine 21 includes a water pump 80 disposed below a region between the crankshaft 22 and the countershaft 33 of a left side wall of the lower crankcase 23L, and a thermostat 81 on a left side of a rear side wall of the cylinder head 25. A radiator 82 is disposed forwardly of the cylinder head 25 of the internal combustion engine 21.

Figure 3:
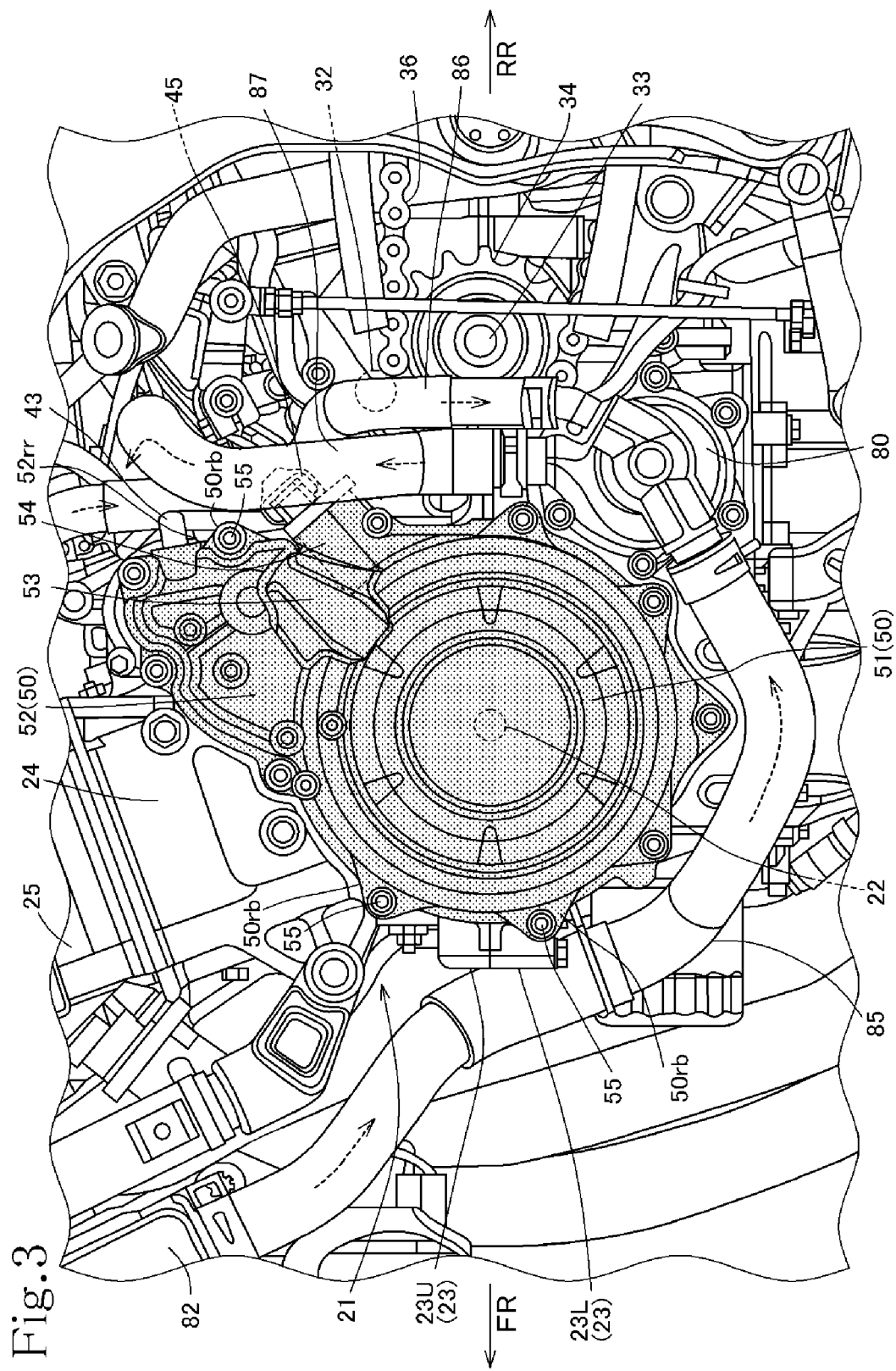
FIG. 3 is a left-hand side elevational view of the internal combustion engine with an output sprocket cover removed.

Referring to FIGS. 2 through 4, a radiator outlet hose 85 extending from the radiator 82 and a bypass hose 86 extending from the thermostat 81 are connected to an inlet port of the water pump 80. A pump outlet hose 87 extending upwardly from an outlet port of the water pump 80 is connected to a water jacket of the cylinder block 24.

The thermostat 81 is connected to a water jacket of the cylinder head 25, and further, a radiator inlet hose 88 is connected between the thermostat 81 and the radiator 82.

Cooling water discharged from the water pump 80 and flowing through the pump outlet hose 87 into the water jacket of the cylinder block 24 flows from the water jacket of the cylinder block 24, circulates in the water jacket of the cylinder head 25, and flows into the thermostat 81.

While the internal combustion engine 21 is being warmed up, the thermostat 81 blocks the flow of cooling water into the radiator 82 and causes the cooling water that has flowed into the thermostat 81 to flow into the bypass hose 86 and return to the water pump 80, thereby promoting the warming-up of the internal combustion engine 21.

When the internal combustion engine 21 starts to operate normally after being warmed up, the thermostat 81 switches to allow cooling water to flow into the radiator 82 and to cause the cooling water that has flowed into the thermostat 81 to flow into the radiator inlet hose 88 and then the radiator 82, thereby lowering the temperature of the cooling water to promote the cooling of the cylinder block 24 and the cylinder head 25.

As illustrated in FIGS. 2 and 3, the pump outlet hose 87 for guiding cooling water discharged from the water pump 80 in a cooling system of the internal combustion engine 21 to the water jacket of the cylinder block 24 extends upwardly from the water pump 80 and outwardly, i.e., leftwardly, widthwise across the vehicle of the crank angle sensor 45 fittingly inserted in the sensor fitting insertion tubular portion 54 of the ACG cover 50.

The pump outlet hose 87 overlaps at least a portion of the crank angle sensor 45, as viewed in side elevation in FIG. 3.

In particular, the pump outlet hose 87 overlaps a proximal end portion of the crank angle sensor 45 that protrudes from the sensor fitting insertion tubular portion 54 of the crank angle sensor 45 on a left side thereof as viewed in side elevation.

The internal combustion engine according to the present embodiment of the present invention described in detail above has the effects to be described below.

As illustrated in FIG. 7, the ACG cover 50 that covers the AC generator 40 from outside widthwise across the vehicle includes the electric power transmission line cover bulging portion 53 that covers the three-phase electric power transmission lines 43 extending from the inner stator 42 of the AC generator 40, and the crank angle sensor 45 for detecting the rotational angles of the crankshaft 22 is disposed behind the electric power transmission line cover bulging portion 53. The electric power transmission line cover bulging portion 53 of the existing ACG cover 50 protects the crank angle sensor 45 from flying stones, etc. without an increase in the number of parts used and hence an increase in the weight of the internal combustion engine.

Referring to FIGS. 7 and 8, the crank angle sensor 45 is fittingly inserted in the ACG cover 50 while being oriented toward the crankshaft center of the crankshaft 22 and is mounted on the ACG cover 50 with the detector 45s facing the outer circumferential surface of the outer rotor 41 of the AC generator 40. Consequently, the crank angle sensor 45 is disposed in a compact layout closely to the electric power transmission line cover bulging portion 53 of the ACG cover 50 rearwardly of the electric power transmission line cover bulging portion 53.

The crank angle sensor 45 can be installed with ease as it is a proximity sensor and hence a contactless sensor.

As illustrated in FIG. 7, as the crank angle sensor 45 and the sensor fitting insertion tubular portion 54 are disposed inwardly widthwise across the vehicle of the outermost portion 53e widthwise across the vehicle of the electric power transmission line cover bulging portion 53 of the ACG cover 50, the front side of the crank angle sensor 45 is covered sufficiently widely with electric power transmission line cover bulging portion 53 of the ACG cover 50, and hence the crank angle sensor 45 is reliably protected from flying stones, etc. from the front.

As illustrated in FIG. 4, since the crank angle sensor 45 is disposed in a position higher than the crankshaft center Cc of the crankshaft 22, the ACG cover 50 acts as a shield against flying stones, etc. hurtled upwardly by the front wheel 9 and flying obliquely rearwardly, thereby protecting the crank angle sensor 45.

As illustrated in FIG. 4, inasmuch as the direction in which the crank angle sensor 45 is fittingly inserted in the sensor fitting insertion tubular portion 54, i.e., the direction in which the straight line Ls is oriented, extends at an acute angle with respect to the straight line Lm interconnecting the output shaft center Cm of the motor output shaft 61 of the starter motor 60 and the crankshaft center Cc of the crankshaft 22, the crank angle sensor 45 and the starter motor 60 can be disposed closely to each other, making the overall internal combustion engine compact.

Referring to FIGS. 3 and 4, the ACG cover 50 includes, as an integral structure, the generator cover portion 51 that covers the outer periphery and the side of the AC generator 40 and the gear cover portion 52 that covers the side of the speed reducer gear mechanism 62, so that the ACG cover 50 covers, as one component, the AC generator 40 and the speed reducer gear mechanism 62, resulting in a reduction in the number of parts used.

As illustrated in FIG. 3, the pump outlet hose 87 for guiding cooling water discharged from the water pump 80 in the cooling system of the internal combustion engine 21 to the water jacket of the cylinder block 24 is disposed outwardly, i.e., leftwardly, widthwise across the vehicle of the crank angle sensor 45. Therefore, the pump outlet hose 87 essentially acts as a shield against flying stones, etc. from outside widthwise across the vehicle, thereby protecting the crank angle sensor 45.

As illustrated in FIG. 3, as the pump outlet hose 87 overlaps at least a portion of the crank angle sensor 45, as viewed in side elevation, the pump outlet hose 87 acts as a shield against flying stones, etc. coming sideways, thereby essentially reliably protecting the crank angle sensor 45.

While the internal combustion engine according to the present embodiment of the present invention has been described above, the present invention is not limited to the above embodiment and covers embodiments in various aspects within the scope of the invention.

For example, vehicles on which the internal combustion engine according to the present invention can be mounted are not limited to the illustrated saddle-type motorcycle 1 and may be a variety of saddle-type vehicles such as scooter-type vehicles or three- or four-wheeled buggies.

REFERENCE SIGNS LIST

1 . . . Motorcycle, 2 . . . Vehicle body frame, 3 . . . Head pipe, 4 . . . Main frame, 5 . . . Down frame, 6 . . . Seat rail, 7 . . . Front fork, 8 . . . Steering handle, 9 . . . Front wheel, 10 . . . Pivot shaft, 11 . . . Rear fork, 12 . . . Rear wheel,
20 . . . Power unit, 21 . . . Internal combustion engine, 22 . . . Crankshaft, 23 . . . Crankcase, 23W . . . Left bearing wall, 23Wa . . . Circular wall, 23Wb . . . Extension wall, 23V . . . Peripheral wall, 23Vf . . . Mating surface, 23Vr . . . Rear peripheral wall, 23U . . . Upper crankcase, 23L . . . Lower crankcase, 24 . . . Cylinder block, 25 . . . Cylinder head, 26 . . . Cylinder head cover, 27 . . . Intake pipe, 28 . . . Exhaust pipe, 31 . . . Transmission, 32 . . . Main shaft, 33 . . . Countershaft (output shaft), 34 . . . Output sprocket, 35 . . . Driven sprocket, 36 . . . Drive chain,
40 . . . AC generator, 41 . . . Outer rotor, 41m . . . Magnet, 41t . . . Detectable protrusion, 42 . . . Inner stator, 42c . . . Electric power generating coil, 43 . . . Three-phase electric power transmission line, 44 . . . Grommet,
45 . . . Crank angle sensor, 45c . . . Tubular case, 45s . . . Detector, 46 . . . Connection cap, 47 . . . Support bracket, 48 . . . Bolt, 49 . . . Connection connector,
50 . . . ACG cover, 51 . . . Generator cover portion, 51r . . . Peripheral wall portion, 51s . . . Side wall portion, 52 . . . Gear cover portion, 52r . . . Peripheral wall portion, 52s . . . Side wall portion, 53 . . . Electric power transmission line cover bulging portion, 54 . . . Sensor fitting insertion tubular portion, 54h . . . Fitting insertion hole, 54a . . . End face lying around upper end opening, 58 . . . Output sprocket cover,
60 . . . Starter motor, 61 . . . Motor output shaft, 62 . . . Speed reducer gear mechanism, 63 . . . Idle shaft, 64 . . . Large-diameter gear, 65 . . . Small-diameter gear, 66 . . . driven gear,
80 . . . Water pump, 81 . . . Thermostat, 82 . . . Radiator, 85 . . . Radiator outlet hose, 86 . . . Bypass hose, 87 . . . Pump outlet hose, 88 . . . Radiator inlet hose.

The invention claimed is:

1. An internal combustion engine for being mounted laterally on a saddle-type vehicle with a crankshaft oriented widthwise across the vehicle and rotatably supported by a crankcase, wherein
an AC generator is disposed on an end portion of the crankshaft which extends through and projects out of the crankcase,
an ACG cover covers the AC generator from outside widthwise across the vehicle,
electric power transmission lines extend from the AC generator and are covered with an electric power transmission line cover bulging portion bulging sideways outwardly widthwise across the vehicle of the ACG cover,
a crank angle sensor for detecting rotational angles of the crankshaft is disposed behind the electric power transmission line cover bulging portion in a vehicle front-back direction,
the crank angle sensor includes a proximity sensor,
the crank angle sensor is fittingly inserted in the ACG cover in a posture oriented toward a crankshaft center of the crankshaft,
the AC generator includes an outer rotor rotatable in unison with the crankshaft, the outer rotor having an outer circumferential surface having a plurality of detectable protrusions arrayed circumferentially thereon, and
the crank angle sensor is mounted on the ACG cover and has a detector (45s) facing the outer circumferential surface of the outer rotor.

2. The internal combustion engine as claimed in claim 1, wherein
the crank angle sensor is disposed inwardly widthwise across the vehicle of an outermost portion widthwise across the vehicle of the electric power transmission line cover bulging portion.

3. The internal combustion engine as claimed in claim 2, wherein
the crank angle sensor is disposed in a position higher than the crankshaft center of the crankshaft.

4. The internal combustion engine as claimed in claim 2, wherein
at least one cooling water hose of a cooling system of the internal combustion engine is disposed outwardly widthwise across the vehicle of the crank angle sensor.

5. The internal combustion engine as claimed in claim 1, wherein
the crank angle sensor is disposed in a position higher than the crankshaft center of the crankshaft.

6. The internal combustion engine as claimed in claim 5, wherein
at least one cooling water hose of a cooling system of the internal combustion engine is disposed outwardly widthwise across the vehicle of the crank angle sensor.

7. The internal combustion engine as claimed in claim 5, wherein
a starter motor is mounted on the crankcase and has a motor output shaft parallel to the crankshaft, and a direction in which the crank angle sensor is fittingly inserted in the ACG cover extends at an acute angle with respect to a straight line interconnecting the crankshaft center of the crankshaft and an output shaft center of the motor output shaft.

8. The internal combustion engine as claimed in claim 7, wherein
a speed reducer gear mechanism for transmitting rotation at a reduced speed is disposed between the motor output shaft and the crankshaft, and
the ACG cover integrally includes a cover portion that covers the speed reducer gear mechanism.

9. The internal combustion engine as claimed in claim 7, wherein
at least one cooling water hose of a cooling system of the internal combustion engine is disposed outwardly widthwise across the vehicle of the crank angle sensor.

10. The internal combustion engine as claimed in claim 8, wherein
at least one cooling water hose of a cooling system of the internal combustion engine is disposed outwardly widthwise across the vehicle of the crank angle sensor.

11. The internal combustion engine as claimed in claim 1, wherein
at least one cooling water hose of a cooling system of the internal combustion engine is disposed outwardly widthwise across the vehicle of the crank angle sensor.

12. The internal combustion engine as claimed in claim 11, wherein
the cooling water hose overlaps at least a portion of the crank angle sensor, as viewed in side elevation.

* * * * *